United States Patent [19]

Strahan et al.

[11] 4,372,646

[45] Feb. 8, 1983

[54] BIREFRINGENT ELECTROMAGNETIC TRANSMISSION LINE THAT PRESERVES THE STATE OF POLARIZED RADIATION PROPAGATING THEREIN

[75] Inventors: Virgil H. Strahan, Orange; Kenneth A. James, Corona del Mar; William H. Quick, La Habra Heights, all of Calif.

[73] Assignee: Rockwell International Corporation, El Segundo, Calif.

[21] Appl. No.: 174,088

[22] Filed: Jul. 31, 1980

[51] Int. Cl.³ ............................................. G02B 5/172
[52] U.S. Cl. ............................ 350/96.31; 350/96.33
[58] Field of Search ............. 350/96.29, 96.30, 96.31, 350/96.33, 96.34

[56] References Cited

U.S. PATENT DOCUMENTS

| | | | |
|---|---|---|---|
| 4,179,189 | 12/1979 | Kaminow et al. | 350/96.33 |
| 4,274,854 | 6/1981 | Pleibel et al. | 350/96.30 X |
| 4,307,938 | 12/1981 | Dyott | 350/96.30 |

OTHER PUBLICATIONS

Schineller et al., "Optical Waveguides Formed by Proton Irradiation of Fused Silica," *J.O.S.A.*, vol. 58, No. 9, Sep. 1968, pp. 1171–1176.
Standley et al., "Properties of Ion-Bombarded Fused Quartz . . .," *Applied Optics*, vol. 11, No. 6, Jun. 1972, pp. 1313–1316.
Il'in et al., "Ion Bombardment of Insulators and Its Application . . .," *Sov. J. Opt. Tech.*, vol. 39, No. 12, Dec. 1972, pp. 771–777.
Houghton et al., "Optical Waveguides Formed by Low-Energy Electron Irradiation of Silica," *Appl. Phys. Lett.*, vol. 29, No. 9, Nov. 1976, pp. 565–566.

*Primary Examiner*—John D. Lee
*Attorney, Agent, or Firm*—H. Fredrick Hamann; Morland C. Fischer

[57] ABSTRACT

A method of fabrication and the resulting structure for a birefringent transmission line having particular application as an optical waveguide. The instant transmission line is fabricated so as to be adapted to maintain the state (e.g. the polarization vector) of polarized electromagnetic radiation propagating therethrough. Birefringence in the instant transmission line is geometrically generated by producing oblong regions having different indices of refraction through a cross-section of the transmission line. A preferred technique by which to generate birefringence includes the method step of bombarding the transmission line with a supply of atomic particles, such as energetic hydrogen ions, whereby to implant a damaged region of oblong cross-section and thereby cause an internal swelling therein. By way of a preferred example, the transmission line herein described may be a single-mode optical fiber.

5 Claims, 8 Drawing Figures

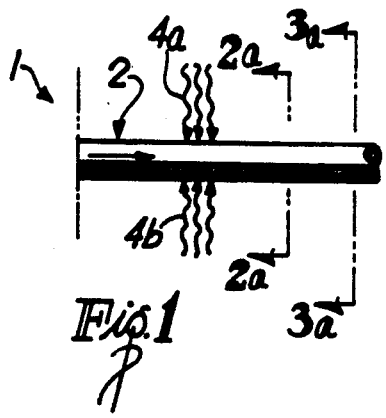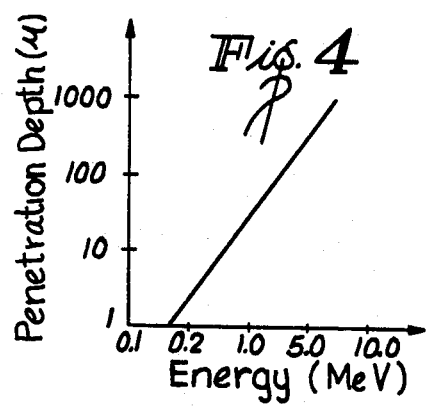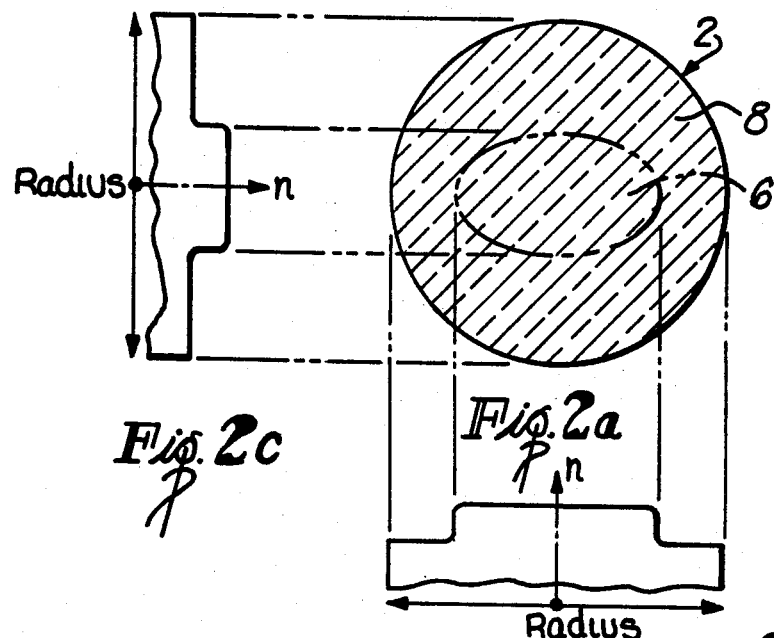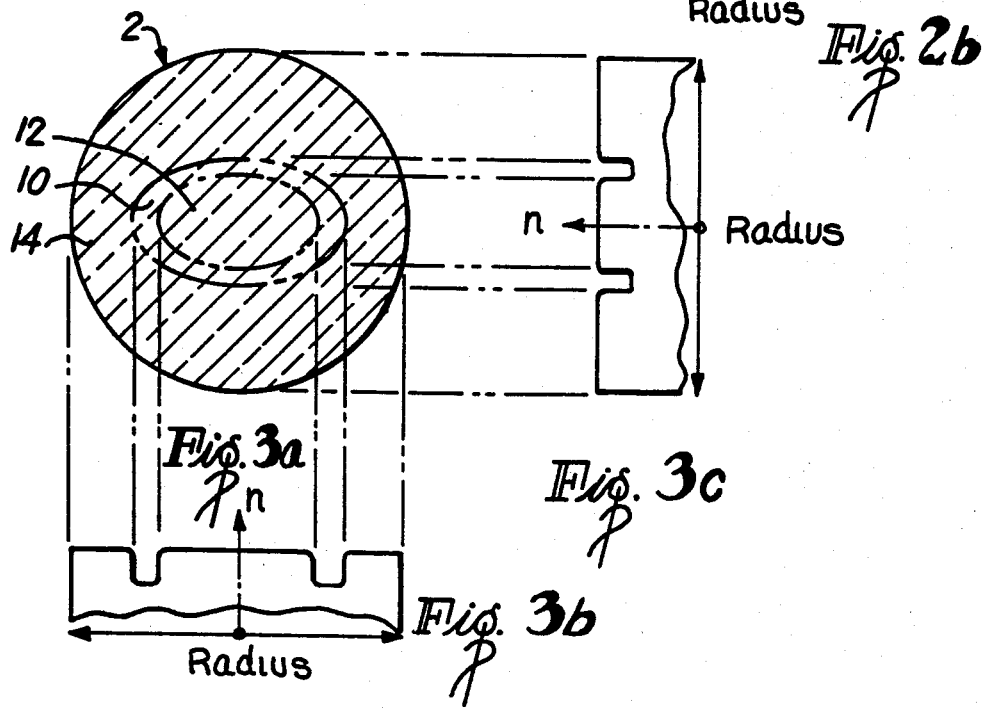

BIREFRINGENT ELECTROMAGNETIC TRANSMISSION LINE THAT PRESERVES THE STATE OF POLARIZED RADIATION PROPAGATING THEREIN

BACKGROUND OF THE INVENTION

1. Field of the Invention

This invention relates to a method of fabrication and to the resulting structure for a birefringent electromagnetic transmission line (such as a single-mode optical fiber) that is adapted to maintain the state of polarized radiation propagating through said transmission line.

2. Prior Art

As will be known to those skilled in the art, certain electromagnetic transmission means permit the propagation therethrough of two different modes of polarized radiation having orthogonal orientations and slightly different phase velocities relative to one another. When the transmission means is subjected to a physical disturbance or force (e.g. temperature or pressure), energy (i.e. power) may be electromagnetically coupled from one polarization mode to another. Examples of the foregoing phenomenon may generally be found by referring to the following U.S. Pat. Nos. 3,439,974—Apr. 22, 1969, 4,111,050—Sept. 5, 1978.

Because of the difference of phase velocities (with regard to the directions of orientation), the relative interference patterns of the propagations at the terminal point of the transmission means may appear different from one another. Depending upon the magnitude and location of the aforementioned physical disturbance, a superposition of the interference patterns may produce respective fringes which are undesirably shifted and reduced in contrast. What is more, should the state of the transmitted polarization be intended to provide an indication of the physical disturbance, then the resulting inter-mode coupling may consequently cause a distortion of the information represented thereby.

By way of example, apparatus which are known to employ transmission means comprising a length of optical fiber to transmit information signals in the form of polarized radiation include gyroscopes, hydrophones, various communication systems, automotive sensors, and the like. It may be desirable that the fiber optic transmission means be characteristically insensitive to various external and environmental physical disturbances or forces, so as to avoid the electromagnetic coupling of energy from one polarization mode to the other and to prevent an upset in the state of the polarized radiation propagating therethrough. A discussion of a single-mode, fiber optic transmission line that is capable of maintaining the state of polarized radiation being transmitted therethrough can be found in the document entitled "Fiber-Ring Interferometer: Polarization Analysis," by Ulrich and Johnson, Vol. 4, No. 5, *Optics Letters* (Optical Society of America) May, 1979. An additional discussion which teaches an optical fiber transmission line that is particularly fabricated so as to be relatively insensitive to the applications of external forces, whereby to preserve the state of polarized radiation traversing the fiber, may be found by referring to U.S. Pat. application Ser. No. 46,968 filed June 8, 1979, (now abandoned) and entitled "Method And Apparatus For Producing An Optical Fiber In Which The Polarization Changes Of Polarized Light Therein Are Insensitive To Externally Applied Forces."

Documents which describe the formation of an optical (e.g. planar) waveguide by radiation processing techniques are those entitled "Optical Waveguides Formed By Proton Irradiation of Fused Silica," by E. Ronald Schineller et al, Vol. 58, *J. Opt. Soc. Am.*, pp. 1171-1176, Sept., 1968 and "Properties of Ion Bombarded Fused Quartz for Integrated Optics" by R. D. Standley et al., Vol. 11, *Applied Optics*, pp. 1313-1316, June, 1972.

SUMMARY OF THE INVENTION

Briefly, and in general terms, a method for fabricating and the resulting structure are disclosed for the implementation of a birefringent electromagnetic transmission line having particular application as a single-mode optical fiber waveguide. Predetermined birefringence in the transmission line is geometrically induced by selectively generating localized regions of strain in the fiber. A preferred technique by which to generate a region of strain and, accordingly, achieve birefringence includes the method step of bombarding a heated, cylindrically symmetric optical fiber, which is fabricated from high purity optically transmissive material, with a supply of radiation prior to the application of a protective outer jacketing material therearound.

In a preferred embodiment of the invention, the optical fiber is impacted by a supply of energetic atomic particles, such as hydrogen ions, whereby to induce therein a damaged region of generally oblong cross-section. This radiation processing step causes a cylindrically symmetric optical fiber to become both electromagnetically asymmetric and biaxially symmetric. That is, the indices of refraction appear to be different along orthogonal axes taken at a cross-section of the fiber, while the refractive index profile of one half of a cross-section of the fiber is a mirror image of the refractive profile of the second half thereof. By virtue of the method that is disclosed in detail hereinafter, a single-mode, birefringent optical fiber transmission line can be fabricated that is capable of maintaining the state (e.g. polarization vector) of polarized electromagnetic radiation being propagated therethrough. Moreover, the instant method may be more easily and inexpensively implemented and more accurately controlled than conventional (e.g. materials or mechanical) attempts to achieve a birefringent optical fiber.

BRIEF DESCRIPTION OF THE DRAWINGS

FIG. 1 is representative of a radiation processing step of the present invention for fabricating a birefringent fiber optic transmission line having desirable polarization characteristics.

FIGS. 2a-2c illustrate a cross-section of the fiber optic transmission line of FIG. 1 and the corresponding profiles of the indices of refraction along orthogonal axes thereof.

FIGS. 3a-3c illustrate a different cross-section of the fiber optic transmission line of FIG. 1 and the corresponding profiles of the indices of refraction along orthogonal axes thereof.

FIG. 4 is exemplary of a relationship between the initial energy level of a radiation source and the depths to which atomic particles generated thereby penetrate a fused silica optical rod.

DESCRIPTION OF THE PREFERRED EMBODIMENT

Described below is a unique method of fabricating and the resulting structure for a birefringent electromagnetic transmission line having particular utilization in single-mode optical waveguide applications. As will be described in greater detail hereinafter, the instant transmission line structure is fabricated so as to be advantageously capable of preserving the direction of the polarization vector of a supply of polarized electromagnetic radiation propagating therethrough over relatively long distances. The electromagnetic transmission line of the present invention may be implemented from a readily available optically transmissive material, which material is common to optical fiber applications. The instant method can be accomplished with high degrees of reliability and control and at a relatively low cost, while the corresponding transmission line may be characterized by maximized flexibility and structural uniformity, relative to mechanical (rectangular) waveguides of the prior art.

The preferred method for making and the corresponding structure of the electromagnetic transmission line of the present invention are now described in detail. Initially, a high purity optical glass, plastic, or polymer material (i.e. containing substantially no impurities that might modify an otherwise uniform index of refraction profile) such as fused silica, or the like, is shaped into a convenient configuration, such as an elongated rod. The rod is placed into a well known fiber pulling machine, wherein heat is applied to reduce the rod to a generally molten state. One molten end of the optical rod is drawn out into a narrow and elongated, cylindrical configuration. For purposes of convenience, this configuration will be referred to as an optical fiber.

Referring now to FIG. 1 of the drawings, during that time in which the heated rod is being drawn by fiber pulling machine 1, but prior to the application of a conventional protective jacketing material around optical fiber 2, said optical fiber is bombarded with a concentration of high energy radiation. In a preferred embodiment of the invention, the radiation emanates from a source of atomic particles. By way of example, the source (not shown) of the radiation may be a well known Van de Graaff generator. More particularly, substantially identical high energy sources irradiate optical fiber 2 at opposite sides thereof with opposing supplies (designated 4a and 4b) of radiation. By way of specific example, the radiation supplies 4a and 4b which impact optical fiber 2 comprise atomic particles having the energy of a proton (i.e. a hydrogen ion) which is approximately 1.6 Mev incident upon a 120 micron (fused silica) optical fiber. FIG. 4 of the drawings is indicative of initial energy levels of a supply of protons and the corresponding depths to which the radiation is likely to penetrate when bombarding a fused silica fiber. Nevertheless, it is to be understood that supplies of other atomic particles, such as ions and lithium or boron, may also be utilized herein. However, the energy of the source must be sufficient so that the atomic particles will penetrate at least to a depth near the cladding-core interface of the fiber 2.

Bombarding fiber 2 with ions from a high energy source causes localized radiation damage at a particular (and predetermined) region within the interior of the fiber. The precise depth of particle penetration and the shape of said region of radiation damage in fiber 2 is selectively dependent upon the initial energy level (i.e. the intensity) of the radiation source and the widths of radiation supplies 4a and 4b. As is best shown in FIG. 2a of the drawings, the irradiation of optical fiber 2 with opposing supplies 4a and 4b of energetic ions is controlled so as to result in the formation of a core region 6 having a generally oblong cross-section, which region is implanted or doped with impurities (i.e. atomic particles) from the source material. The core 6 is surrounded by an undamaged cladding 8. Those skilled in the art will recognize that the radiation processing method step of the present invention may be relatively easily controlled and can produce the oblong, radiation damaged region 6 in optical fiber 2 with greater accuracy and less difficulty than would presently be likely by otherwise employing a conventional vapor deposition process. More particularly, and by way of example, the oblong shape of region 6 may be selectively controlled by means of either a well known optical shuttering technique, varying the (ion) structure of the source, or by adjusting the focus or the intensity of the source with respect to time and the position of the optical fiber 2.

The radiation damaged, oblong region 6 creates a radiation induced change in the refractive index profile of optical fiber 2. In the embodiment shown in FIG. 2a, wherein the core 6 of optical fiber 2 comprises the region of oblong cross-section, the index of refraction of the radiation damaged region is higher than that of the undamaged cladding 8. By way of specific example, the difference between the indices of refraction of the cladding 8 and the core 6 is approximately $5 \times 10^{-3}$. More particularly, by virtue of the aforementioned fabrication step of bombarding an optical fiber with atomic particles, a cylindrically symmetric optical fiber 2 becomes characteristically electromagnetically asymmetric. That is, the respective indices of refraction appear to be different along orthogonal axes at any cross-section of the irradiated length of fiber 2. The refractive index profiles along two orthogonal axes of the optical fiber shown in FIG. 2a are illustrated in FIGS. 2b and 2c, respectively. Moreover, and after selective irradiation, optical fiber 2 may also be characterized as biaxially symmetric. In general terms, the refractive index profile of one half of fiber 2 is in the mirror image of the profile of the second half thereof. In other words, optical fiber 2 is 180° rotationally symmetric (with respect to its refractive index profile) along the longitudinal axis thereof.

In the embodiment shown in FIG. 3a of the drawings, the optical fiber 2 has been selectively irradiated and the shape and location of the resulting damaged region controlled (as described above), so that impurities from the radiation supplies 4a and 4b (of FIG. 1) lie in a first cladding 10 of generally oblong cross-section. The first cladding 10 surrounds the core 12, and a second cladding 14 surrounds the radiation damaged, first cladding 10. In the double-clad optical fiber of FIG. 3a, each of the core 12 and second cladding 14 are substantially undamaged. Hence, the oblong-shaped cladding 10 causes the cylindrical optical fiber 2 of FIG. 3a, to become both electromagnetically asymmetric and biaxially symmetric, as was defined above. However, in the instant embodiment, the index of refraction of the radiation damaged first cladding 10 is less than that of either of the core 12 of second cladding 14. The refractive index profiles along two orthogonal axes of the optical fiber 2 shown in FIG. 3a are illustrated in FIGS. 3b and 3c, respectively.

Those skilled in the art will also appreciate that many prior art attempts to produce biaxial symmetry in an optical fiber are typically mechanical in nature. Such prior attempts contemplate the notching (i.e. grooving) and physically drawing out or stressing a fiber until a quasi-eliptical fiber cross-section is achieved. By way of example, one such prior art attempt of mechanically manipulating an optical fiber as just described to physically induce strain therein can be found in "Fiber Optic Communications" by Ivan T. Kaminow, *Laser Focus*, pp. 80-84, June, 1980. However, (and unlike the symmetrical cylindrical shape in which a fiber is maintained throughout the disclosed method), as a consequence of its quasi-eliptical shape, physical stresses will be undesirably intensified when biaxial symmetry has been achieved by means of a conventional mechanical technique, such as that described above.

The localized radiation implanting of impurities in an oblong-shaped region (designated 6 and 10 in FIGS. 2a and 3a, respectively) causes an internal swelling within the cylindrical optical fiber 2. Accordingly, a corresponding strain is produced within the fiber 2, inasmuch as the depth of the radiation damage and the corresponding profile of refractive indices along two orthogonal axes thereof differ from another. The oblong strain region produced within optical fiber 2 causes said fiber to become geometrically birefringent, which may be highly advantageous in many optical waveguide applications. Moreover, the greater the eccentricity (i.e. the ratio of the length to the width) of the oblong-shaped region of radiation damage, the greater is the geometrical birefringence. The method of making an optically transmissive fiber geometrically birefringent according to the present invention avoids those problems (such as that caused by material imperfections) typically associated with a conventional process of producing material birefringence. What is more, in order to achieve material birefringence, either a single crystalline material must be utilized or, in the event that the material is non-crystalline in structure, an external stress has heretofore been induced, which is similar to the undesirable approach described above.

The birefringent electromagnetic transmission line that is fabricated in accordance with the method steps hereinbefore disclosed is particularly useful when utilizing said transmission line as a relatively long line, single-mode optical fiber. However, it is to be understood that the method and structure of the present invention are also applicable to generally large core, multi-mode fibers (e.g. light-pipes), as well. Birefringence prevents the rotation of the particular polarization vector associated with a polarized electromagnetic (e.g. optical) radiation signal being launched into optical fiber 2. More particularly, the optically transmissive optical fiber 2 appears birefringent when light that is transmitted therethrough has two modes of different polarization orientation. Such (geometric) birefringence causes the distance traveled by light in one mode of polarization to be different from that traveled in the other mode. This result is achieved, because the profiles of the respective indices of refraction are different in the two corresponding orthogonal directions. Moreover, the greater the difference in the respective indices of refraction, the less likely will electromagnetic energy couple from one mode of polarization to the other. Therefore, normal material and environmental purturbations do not contribute to a inter-mode coupling of energy. Hence, energy transmission (i.e. attenuation) losses are minimized when transmitting optical radiation via birefringent optical fiber 2, and the propagation vector of an electromagnetic signal can, therefore, be preserved.

By way of particular example, the above-described birefringent transmission line is suitable to transmit a polarized optical signal from an optical transducer to an optical detector, should certain polarization characteristics (e.g. the angle of polarization of depolarization) of said signal be indicative of a physical parameter. For one such sensing system wherein it is desirable to preserve the integrity of a polarized electromagnetic signal during transmission through an optical fiber waveguide for ultimate analysis, reference may be made to Patent Application Ser. No. 146,929 filed May 5, 1980, (now abandoned) and entitled Optical Deformation Sensor.

It will be apparent that while a preferred embodiment of the invention has been shown and described, certain modifications and changes may be made without departing from the spirit and scope of the invention. By way of example, although only a pair of high energy sources of oppositely directed supplies of radiation are illustrated (in FIG. 1), it is to be understood that this is not intended as a limitation of the present invention. More particularly, it is to be understood that any number of radiation sources may be suitably positioned with respect to an optical fiber, so that a localized region of radiation damage may be selectively implanted in said fiber. It is also to be understood that the presently disclosed radiation processing step produces geometric birefringence during the fabrication of an optical fiber. The more conventional prior art attempts to achieve birefringence (which contemplate either mechanical or material processing) are relatively unreliable, expensive, time consuming, and are adapted to be utilized after an optical fiber has been completely fabricated (and the outer protective jacketing material has been applied thereto).

Having thus set forth a preferred embodiment of the present invention, what is claimed is:

1. The structure for a geometrically configured birefringent optical waveguide comprising:
   a cylindrically symmetrical rod of optically transmissive material, and
   an index of refraction altered region of oblong cross-section comprising implanted ions selectively located within said rod to cause the respective profiles of the indices of refraction along two orthogonal axes of said rod to be different from one another.

2. The structure recited in claim 1, wherein said oblong region lies at the center of said cylindrically symmetrical rod,
   said oblong region being surrounded by an additional region having an index of refraction which is lower than that of said oblong region.

3. The structure recited in claim 1, wherein said oblong region lies between two other regions, each of said regions having a higher index of refraction than that of said oblong region.

4. The structure recited in claim 1, wherein said optical waveguide is a single-mode optical fiber.

5. The structure recited in claim 1, wherein said implanted ions are hydrogen ions.

* * * * *